US011141951B2

(12) United States Patent
Mao et al.

(10) Patent No.: US 11,141,951 B2
(45) Date of Patent: Oct. 12, 2021

(54) MEMBRANE-COATED SINTERED POROUS MEDIA FOR SAMPLE COLLECTION

(71) Applicant: Porex Corporation, Fairburn, GA (US)

(72) Inventors: Guoqiang Mao, Peachtree City, GA (US); Kyle Thomas Harris, Mableton, GA (US); Katlin Marie Lumme, Mableton, GA (US); Jeffrey John Williams, Peachtree City, GA (US)

(73) Assignee: Porex Corporation, Fairburn, GA (US)

( * ) Notice: Subject to any disclaimer, the term of this patent is extended or adjusted under 35 U.S.C. 154(b) by 75 days.

(21) Appl. No.: 15/549,044

(22) PCT Filed: Feb. 18, 2016

(86) PCT No.: PCT/US2016/018466
§ 371 (c)(1),
(2) Date: Aug. 4, 2017

(87) PCT Pub. No.: WO2016/137814
PCT Pub. Date: Sep. 1, 2016

(65) Prior Publication Data
US 2018/0036994 A1    Feb. 8, 2018

Related U.S. Application Data

(60) Provisional application No. 62/120,032, filed on Feb. 24, 2015.

(51) Int. Cl.
*B01L 3/00*    (2006.01)
*B32B 3/20*    (2006.01)
(Continued)

(52) U.S. Cl.
CPC ............. *B32B 3/20* (2013.01); *B01L 3/021* (2013.01); *B01L 3/0275* (2013.01);
(Continued)

(58) Field of Classification Search
CPC ........................................................ B32B 3/20
(Continued)

(56) References Cited

U.S. PATENT DOCUMENTS 5,833,927 A    11/1998 Raybuck et al.
6,045,757 A    4/2000 Moriarty
(Continued)

FOREIGN PATENT DOCUMENTS

EP    2376683 B1    6/2014
WO    00/04985 A1    2/2000
(Continued)

OTHER PUBLICATIONS

International Preliminary Report on Patentability, PCT Application No. PCT/US2016/018466, dated Sep. 8, 2017.
(Continued)

*Primary Examiner* — Christine T Mui
*Assistant Examiner* — Emily R. Berkeley
(74) *Attorney, Agent, or Firm* — Kilpatrick Townsend & Stockton LLP

(57) ABSTRACT

The present application provides devices and methods of making and using these devices. The devices comprise a sintered porous polymeric material, a porous membrane attached to at least a portion of the sintered porous polymeric material, and optionally a housing which surrounds at least a portion of the sintered porous polymeric material. The devices can be used for sample collection, purification and transfer.

17 Claims, 9 Drawing Sheets

(51) Int. Cl.
  *B01L 3/02* (2006.01)
  *C02F 1/00* (2006.01)
  *C40B 50/04* (2006.01)
  *C40B 50/08* (2006.01)

(52) U.S. Cl.
  CPC ............ *B01L 3/5029* (2013.01); *C02F 1/002* (2013.01); *C40B 50/04* (2013.01); *C40B 50/08* (2013.01); *B01L 2300/0681* (2013.01)

(58) Field of Classification Search
  USPC ...................................................... 436/180
  See application file for complete search history.

(56) References Cited

U.S. PATENT DOCUMENTS

| | | | |
|---|---|---|---|
| 6,048,457 A | 4/2000 | Kopaciewicz et al. | |
| 6,217,764 B1* | 4/2001 | Bellhouse | B01D 63/063 |
| | | | 210/321.69 |
| 6,808,908 B2 | 10/2004 | Yao et al. | |
| 7,094,464 B2 | 8/2006 | Mao et al. | |
| 7,318,911 B2 | 1/2008 | Smith | |
| 7,488,603 B2 | 2/2009 | Gjerde et al. | |
| 7,674,517 B2 | 3/2010 | Ramsey et al. | |
| 7,785,466 B1 | 8/2010 | Smith | |
| 7,993,909 B2* | 8/2011 | Hoon | B82Y 5/00 |
| | | | 435/287.2 |
| 8,141,717 B2* | 3/2012 | Wingo | B01D 39/1661 |
| | | | 210/500.22 |
| 2008/0017569 A1* | 1/2008 | Ramsey | B01D 67/0004 |
| | | | 210/490 |

FOREIGN PATENT DOCUMENTS

| | | |
|---|---|---|
| WO | 2007/133609 A2 | 11/2007 |
| WO | 2012/145379 A1 | 4/2012 |
| WO | 2012/145390 A9 | 10/2012 |

OTHER PUBLICATIONS

International Search Report and Written Opinion, PCT Application No. PCT/US2016/018466, dated Feb. 18, 2016.

* cited by examiner

MEMBRANE-COATED SINTERED POROUS MEDIA FOR SAMPLE COLLECTION

PRIOR RELATED APPLICATIONS

This application is a national stage application of PCT/US2016/018466, filed on Feb. 18, 2016, which claims priority to U.S. Provisional Application No. 62/120,032, filed on Feb. 24, 2015, both of which are incorporated herein by reference in their entireties.

FIELD OF THE INVENTION

The present application provides devices and methods of making and using these devices. The devices comprise a sintered porous polymeric material and a porous membrane attached to at least a portion of the sintered porous polymeric material. The devices may further comprise a housing which contains a portion of the sintered porous polymeric material which is at least partially covered by the porous membrane, wherein the porous membrane also contacts the housing adjacent to the sintered porous polymeric material. The devices can be used for sample collection, purification and transfer.

BACKGROUND OF THE INVENTION

Current sintered porous plastic media and membrane media are both widely used in sample preparation and separation. Traditional membranes have been used for decades in filtration of bacteria, blood and to remove solids. Traditional membranes are flexible thin sheets with thicknesses generally less than 200 microns. Although these membranes are known to perform adequately in sample preparation and separation, they are very difficult to assemble into a device due to their lack of three dimensional profile and softness. They either require support or must be welded onto a housing.

Sintered porous media are generally rigid and can be easily assembled into a device. Unlike membrane product, which is only available in a thin sheet form, sintered porous media are molded with pre-designed, three-dimensional profiles, which fit a variety of device designs. However, sintered porous media generally have a large pore size (greater than 1 micron), which could not meet the needs of submicron liquid filtration for sample preparation. Currently, there is no commercial product in the field of sample preparation and separation that uses membrane-coated sintered porous media to achieve submicron pore size range filtration capability.

Sintered porous fiber media are extruded or formed into the shape of a sheet, rod or tube. Rods and tube formed products can be easily assembled into a housing. However sintered porous fiber media generally have a large pore size (greater than 1 micron), which cannot meet the needs of submicron liquid filtration for sample preparation. Currently, there is no commercial product in the field of sample preparation that uses membrane-coated porous fiber media to achieve submicron pore size range filtration capability.

U.S. Pat. Nos. 6,045,757, 7,785,466 and U.S. Pat. No. 7,488,603 described using a pre-formed membrane as a filter in a pipette tip device. However, the process of introducing a very thin membrane into the device and sealing the device is difficult. There are no successful commercial products in this area. U.S. Pat. No. 6,048,457 described a method of in-situ forming a membrane in a pipette tip by mixing absorbent particles with membrane polymer solution, but this process is difficult using high viscosity solutions.

SUMMARY

The present invention solves these problems and provides a device comprising a sintered porous polymeric material and a porous membrane attached to at least a portion of the sintered porous polymeric material. The present invention further provides a device comprising a sintered porous polymeric material, a porous membrane and a housing, wherein the porous membrane is attached to at least a portion of the sintered porous polymeric material and to the outer surface of the housing adjacent to the sintered porous polymeric material. The process of present invention provides a simple, reproducible way of making and using these devices. In one embodiment the present invention provides devices comprising a pipette tip or a filtration device housing a rigid porous polymeric medium partially covered with a submicron filter membrane.

The devices of the present invention provide filtration capabilities in the submicron pore size range. The present invention provides a technical solution and a cost effective method to achieve submicron filtration in a device for sample preparation. In one embodiment, sintered porous media is a support for a porous membrane and the membrane is covers part of the sintered porous media and adjacent housing.

In one embodiment, the porous polymeric material is sintered and comprises plastic particles.

In another embodiment, the porous polymeric material is sintered and comprises plastic particles optionally in combination with elastomeric particles.

In yet another embodiment, the sintered porous polymeric material comprises fibers, for example bicomponent fibers.

Porous membranes include, but are not limited to, polyvinylidene fluoride (PVDF), nylon, polysulfone, polyethersulfone (PES), polyacrylonitrile, and cellulose based material such as cellulose acetate and nitrocellulose membranes.

The porous membrane can be formed using a phase inversion method, a dry evaporation method or a thermally induced phase separation method.

The present invention also provides a method of making these devices.

The devices can be used for sample collection, sample purification and sample transfer.

The device is a disposable device, such as a pipette tip filter, a syringe filter, a centrifuge filter, a dialysis filter, a squeeze filter or a vacuum filter.

The present invention also provides methods of using these devices for sample collection, sample purification, sample transfer and isolation of analytes from a sample.

Other objects and advantages of the invention will be apparent from the following summary and detailed description of the embodiments of the invention taken with the accompanying drawing figures.

BRIEF DESCRIPTION OF THE FIGURES

FIG. 7. Schematic representation of three devices comprising a pipette tip, a sintered porous filter and a membrane formed from a solution coating the sintered porous filter and the adjacent outer surface of the pipette tip. The membrane forms a seal and prevents leakage of fluid from the lumen of the pipette tip.

DETAILED DESCRIPTION

Figure 1:
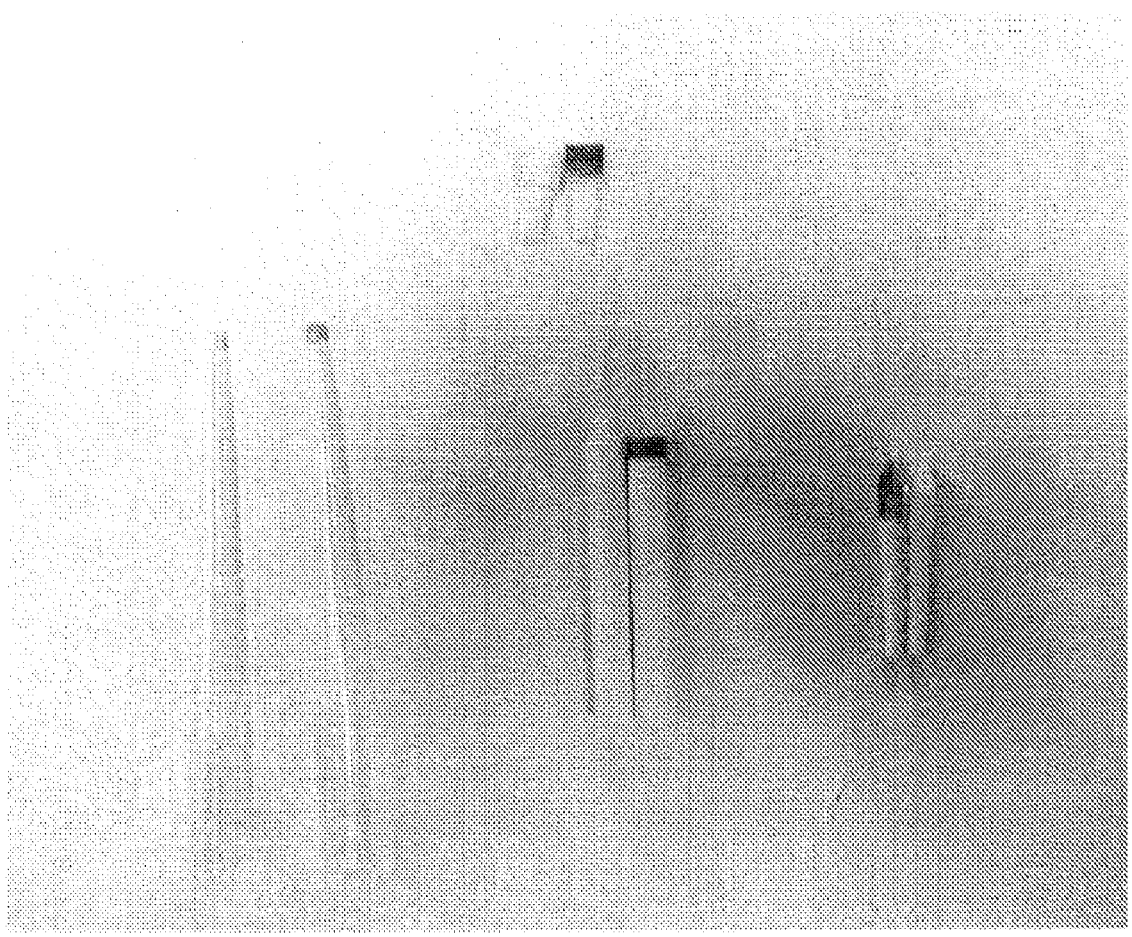
FIG. 1. Schematic representations of PVDF membrane-coated sintered porous polyethylene media and devices. The membrane-coated area is dark. White areas are uncoated.

The present invention provides a device comprising a rigid and/or self-supporting sintered porous polymeric material and a porous membrane attached to at least a portion of the porous polymeric material. The present invention further provides a device comprising a sintered porous polymeric material, a porous membrane and a housing containing a portion of the sintered porous polymeric material, wherein the porous membrane is attached to at least a portion of the sintered porous polymeric material and to the outer surface of the housing adjacent to the sintered porous polymeric material. The present invention also provides a simple, reproducible way of making and using these devices. In one embodiment the present invention provides device comprising a pipette tip or a filtration device housing a rigid porous polymeric medium partially covered with a submicron filter membrane.

In one embodiment, the device of the present invention provides filtration capabilities in the submicron pore size range.

The rigid and/or self-supporting porous polymeric material may be sintered porous plastic, sintered porous elastomeric material, a combination of sintered porous plastic and sintered elastomeric material, sintered glass, sintered ceramic, or porous fiber materials.

The rigid and or self-supporting porous media can have different three-dimensional profiles, such as a rod, sphere, tube, disk or other complicated shapes.

Medical devices or components thereof include those devices and components that would benefit from use of the membrane-coated, self-supporting porous media of the present invention. Such medical devices include, but are not limited to a filter and a vent.

Sintered Porous Materials

Sintered porous materials, also called media herein, in the present invention are made from fusing polymeric particles together or fusing polymeric fibers together. Sintered porous media made from polymeric particles are generally called sintered porous media. Sintered porous media made from polymeric fibers are generally called sintered porous fiber media. In sintered porous plastic media, plastic polymeric particles are partially fused together to form a matrix and the spaces between polymeric particles are pores. In sintered porous fiber media, polymer fibers are partially fused together to form a matrix and spaces between polymer fibers are pores.

In one embodiment, sintered porous materials comprise sintered porous plastic. In another embodiment, porous materials comprise sintered porous plastic optionally in combination with elastomeric material. In one embodiment, the sintered porous material comprises fibers, such as extruded fibers. In one embodiment, the sintered porous material comprises sintered porous plastic particles. In another embodiment, the sintered porous material comprises sintered porous plastic particles in combination with elastomeric particles. Inclusion of elastomeric materials generally increases compressibility of the material. The sintered materials disclosed in U.S. Pat. Nos. 6,808,908 and 8,141,717 can be used in different embodiments of the present invention.

In another embodiment, the self-supporting porous material comprises a sintered porous fiber material. The sintered porous fiber materials listed in European Patent No. EP 2376683 can be used in embodiments of the present invention.

Sintered porous materials generally are rigid and self-supporting. In some applications, a flexible and stretchable porous material is preferred for its flexibility and elasticity. In this case, sintered porous elastomeric material is used. Sintered porous elastomeric materials may comprise one or more elastomeric materials. Elastomeric materials that can be sintered into sintered porous elastomeric media are provided herein. In one embodiment, the sintered porous material is made from mixtures of plastic and other materials to provide sintered porous material with a variety of hardness, flexibility and durability. For example, the sintered porous material may be made from mixtures of plastic materials and elastomeric materials in order to produce a sintered porous material with the desired rigidity/flexibility combination. Potential ratios of plastic materials and elastomeric materials in the sintered porous materials can vary from 9.9 to 0.1, from 9.5:0.5 to 0.5:9.5, from 9:1 to 1:9; or from 8:2 to 2:8. The elastomeric materials may be sintered elastomeric materials.

Porous Membranes

Porous membranes include, but are not limited to, PVDF, nylon, polysulfone, polyethersulfone (PES), polyacrylonotrile, and cellulose based membranes, such as cellulose acetate membranes and nitrocellulose membranes. In one embodiment, the membrane has an average pore size from 0.001 micron to 1 micron. In another embodiment, the membrane has an average pore size from 0.005 micron to 0.5 micron. In another embodiment, the membrane has an average pore size from 0.01 micron to 0.5 micron. In one embodiment, a porous membrane is a phase-inversion porous membrane.

Common solvents for the membranes are dimethylacetamide (DMAc), n-methyl pyrrolidone (NMP), dimethylsulfoxide (DMSO), dimethylformamide (DMF), isopropyl alcohol (IPA), ketones, mineral oil, organic acids and mixtures thereof as known to one of ordinary skill in the art. Common non solvents are water, methanol, ethanol and mixtures thereof. Membrane forming formulations and processes are disclosed in U.S. Pat. No. 7,674,517. The membrane forming processes, solvent systems and non-solvent systems are described in published books. For example see, M. Mulder "Basic principles of membrane technology", Kluwer Academic Publishers, Dordrecht, 1996.

In another embodiment the membrane may be functionalized to provide binding sites for various molecules. For example, the Fc fragment of antibodies may be bound to the membrane so that proteins which bind to the Fab fragments of the antibodies may be bound and isolated. In this manner, specific proteins in a biological sample, such as plasma, may be bound to the membrane and isolated. Such proteins or other antibody specific analytes can then be eluted and characterized and/or measured. The membrane can also be formulated or modified to have high binding capability for biotinylated bovine serum albumin (BSA). Biotinylated membrane surfaces provide capabilities for selecting many biological molecules as known to one of ordinary skill in analytical chemistry and biochemistry. Other molecules that may be bound to membranes include but are not limited to lectins, oligonucleotides, peptides, glycoproteins, antibodies, or specific binding agents for tumor markers, for example prostate-specific antigen.

In one embodiment, the membrane-coated porous media can be treated with chemicals to increase binding or reduce binding of molecules. For example, the membrane-coated porous media can be treated with plasma under different vapor environments, such as oxygen, argon, ammonia, methanol, acrylic acids, etc. The membrane-coated porous media can also be treated with one or more solutions of polyelectrolytes. These polyelectrolytes on the membranes can be further cross-linked on the surface of the membrane-coated porous media. One possible polyelectrolyte treatment is found in U.S. Pat. No. 7,094,464. In different embodiments, porous membranes may be treated with polyethylene glycol, or polyvinyl alcohol to reduce the non-specific binding of biomolecules. Commercial products used in stabilizing biomolecules or blocking non-specific interactions can also be used in treat porous membranes, such as STABIBLOT™, STABIZYME™ and STABIGUARD™ product from SurModics, Inc. (Eden Prairie, Minn.).

In different embodiments, the membrane-coated porous media can be either hydrophilic or hydrophobic. The sintered porous polymeric media are generally hydrophobic but treating the surface with plasma or other treatments can result in a hydrophilic surface. The porous membranes may be hydrophilic or hydrophobic depending on their chemical nature and formulation, as known to one of ordinary skill in the art. A hydrophilic filter comprises a hydrophilic sintered porous polymeric media and hydrophilic membrane.

In one embodiment, the membrane-coated porous media may have a surface area from 2 $cm^2$/gram to 20 $m^2$/gram.

In one embodiment, the sintered porous media is a generally rigid structure, with one open end, one closed end and a hollow cylindrical structure. In another embodiment, the sintered porous media is a generally rigid structure, with two open ends and a hollow cylindrical structure. It is to be understood that the devices of the present invention encompasses sintered porous media of many different shapes.

Devices

Devices comprising the sintered porous polymeric media and the membrane of the present invention can be various devices, such as sample collection devices, separation devices, purification devices or detection devices. Such devices include, but are not limited to, pipetting devices, suction devices, centrifuge devices, dialysis devices, filtration devices, diagnostic devices and venting devices. The porous polymeric media may be flexible or rigid, depending on the requirements of the application.

In one embodiment, the device is a sterilization filtration device. An aqueous-based solution is sterilized when it passes through a filter with less than 0.2 micron pore size because the bacteria cannot pass through the filter. The device described in present invention can be used as a traditional syringe filter, especially for a small volumes of liquid. Traditional syringe filters relatively large amounts of liquid in its housing. The present devices significantly reduce the volume of the retained liquid.

In another embodiment, the present devices can bind different biomolecules, such as proteins, antibodies, antigens, biotin, and oligonucleotides. The phase inversion membrane on the filter can also bind different types of biomolecules.

In yet another embodiment, the present devices can be used as a part of spin filter, the liquid in the device could be pushed through the spin filter by applying a centrifugal force to it.

In another embodiment, the present devices can be used as a part of dialysis filter, the molecules inside the liquid can pass through the filter by osmotic force.

In one embodiment, the device can be used as a probe. The filter of the device can be pre-coated with an affinity binding agent. The device can be dipped into a liquid containing the target analyte and the liquid can be pulled through the filter by application of vacuum. The analyte in the liquid sample binds to the affinity binding agent on the filter surface. The filter can be further purified by rinsing. The purified, enriched bound analyte can be detected either directly on the tip or released from the tip for further analysis by analytical equipment. The affinity binding agent can be an antibody or a fragment thereof, a protein, a fragment of a protein, a nucleotide, biotin, etc. The analytes in the liquid can be biomarkers, toxicity molecules, antibodies, streptavidin, nucleotides, proteins, peptides, viruses, bacteria, etc. The liquid can be a biological fluid such as blood, urine, saliva, bile, plasma, milk, cerebrospinal fluid, gastrointestinal fluid, peritoneal fluid, pleural fluid, amniotic fluid, pus, feces, or any other biological fluid. The liquid can be a culture medium, an assay buffer, saline or any other liquid.

The devices of present invention are generally for disposable use. They are designed for handling relatively small amounts of liquid samples from a few microliters to a few hundred milliliters. The devices of present invention are not suitable for a cross-flow filtration device which is designed for industrial water treatment.

In one embodiment, the sintered porous media of the present invention comprise sintered porous materials partially or completely coated with a phase inversion porous membrane. In one embodiment, the sintered porous media of the present invention comprise sintered porous plastics optionally in combination with elastomeric materials, and partially or completely coated with a porous membrane. In another embodiment, the sintered porous media comprises fiber material, partially or completely coated with a porous membrane.

In another embodiment, the devices of the present invention further comprise a liquid absorbent material. The liquid absorbent material is located inside the inner wall of the housing and next to the membrane-coated sintered porous media. The liquid absorbent material can absorb the liquid that passes through the filter. The absorbent material may be a cotton, such as a cotton ball, or hydrophilic polymer fibers, open cell polymer foams, or another piece of sintered porous media.

Structure and Composition of Sintered Porous Materials

The sintered porous media can be provided in many different shapes, such as a cap, sphere, rod, hollowed rod, cylinder, disk, and complicated shapes. In some embodiments, the porous media can be syringe filter or a pipette filter.

In one embodiment, the sintered porous media may be flexible. A flexible sintered porous media is made by sintering elastomeric polymer particles or combining elastomeric polymer particles with plastic polymer particles.

In another embodiment, the sintered porous media may be rigid. A rigid sintered porous media is made by sintering plastic polymer particles.

In one embodiment, porous membranes were formed on the surface and at least some of the pores of the sintered porous materials after the sintered porous materials were formed. The membranes were formed on the surface and at least some of the pores of the sintered porous materials through a solution coating and phase inversion process.

In another embodiment, porous membranes are formed on the outer surface of part of the housing and at least some of the pores of sintered porous materials after sintered porous materials are assembled into the housing. The porous membranes are formed on part of the outer surface of the housing adjacent to the sintered porous material in the housing, and also on the surface and at least some of the pores of sintered porous materials through a solution coating and phase inversion process. The membrane that covers the surface of the sintered porous material and the outer surface of the adjacent housing forms a seal between the sintered porous materials and the outer surface of the housing to prevent fluid leakage. Sintered porous materials have an average pore size over 5 microns, over 10 microns, over 20 microns, over 50 microns, or over 100 microns. The average pore size of the porous membrane is less 1 micron, less than 0.5 microns, less than 0.2 microns, less than 0.1 microns, less than 0.01 microns, or less than 1 nm.

Thermoplastic Materials that can be Used in Sintered Porous Plastic Media for Porous Objects Plastics suitable for use in sintered polymeric media of the present invention, in some embodiments, comprise polyolefins, polyamides, polyesters, rigid polyurethanes, polyacrylonitriles, polycarbonates, polyvinylchloride, polymethylmethacrylate, polyvinylidene fluoride, polytetrafluoroethylene, polyethersulfones, polystyrenes, polyether imides, polyetheretherketones, or polysulfones, and combinations and copolymers thereof.

In some embodiments, a polyolefin comprises polyethylene, polypropylene, and/or copolymers thereof. Polyethylene, in one embodiment, comprises high density polyethylene (HDPE). High density polyethylene, as used herein, refers to polyethylene having a density ranging from about 0.93 g/cm$^3$ to about 0.97 g/cm$^3$. Polyethylene, in one embodiment, comprises medium density polyethylene. Medium density polyethylene (MDPE), as used herein, refers to polyethylene having a density ranging from about 0.92 g/cm$^3$ to about 0.93 g/cm$^3$. Polyethylene, in one embodiment, comprises low density polyethylene. Low density polyethylene (LDPE), as used herein, refers to polyethylene having a density ranging from about 0.91 g/cm$^3$ to about 0.92 g/cm$^3$. Polyethylene, in one embodiment, comprises linear low density polyethylene. Linear low density polyethylene (LLDPE), as used herein, refers to polyethylene having a density ranging from about 0.91 g/cm$^3$ to about 0.92 g/cm$^3$. Polyethylene, in one embodiment, comprises very low density polyethylene. Very low density polyethylene (VLDPE), as used herein, refers to polyethylene having a density ranging from about 0.89 g/cm$^3$ to about 0.91 g/cm$^3$. In another embodiment, polyethylene comprises ultrahigh molecular weight polyethylene (UHMWPE). Ultrahigh molecular weight polyethylene, as used herein, refers to polyethylene having a molecular weight greater than 1,000,000. In another embodiment, polyethylene comprises very high molecular weight polyethylene (VHMWPE). Very high molecular weight polyethylene, as used herein, refers to polyethylene having a molecular weight greater than 300,000 and less than 1,000,000. In another embodiment, polyethylene, in this invention can be cross-linked polyethylene.

Sintered polymeric plastic materials according to some embodiments of the present invention are porous. In one embodiment, for example, a sintered polymeric plastic material has a porosity ranging from about 10% to about 90%. In another embodiment, a sintered polymeric plastic material has a porosity ranging from about 20% to about 80% or from about 30% to about 70%. In a further embodiment, a sintered polymeric plastic material has a porosity ranging from about 40% to about 60%.

Porous sintered polymeric plastic media, according to some embodiments of the present invention, have an average pore size ranging from about from about 1 µm to about 200 µm. In other embodiments, porous sintered polymeric plastic materials have an average pore size ranging from about 2 µm to about 150 µm, from about 5 µm to about 100 µm, or from about 10 µm to about 50 Sintered polymeric plastic materials, according to some embodiments, have a density ranging from about 0.1 g/cm$^3$ to about 1 g/cm$^3$. In other embodiments, a sintered polymeric plastic material of the present invention has a density ranging from about 0.2 g/cm$^3$ to about 0.8 g/cm$^3$ or from about 0.4 g/cm$^3$ to about 0.6 g/cm$^3$. In a further embodiment, a sintered polymeric plastic material comprising at least one plastic and at least one elastomer has a density greater than about 1 g/cm$^3$.

Elastomeric Materials that May be Used in Sintered Porous Media

Elastomers suitable for use in sintered polymeric materials of the present invention, according to some embodiments, comprise thermoplastic elastomers (TPE). Thermoplastic elastomers comprise polyurethanes and thermoplastic polyurethanes (TPU). Thermoplastic polyurethanes, in some embodiments, include multiblock copolymers comprising a polyurethane and a polyester or polyether.

In other embodiments, elastomers suitable for use in sintered porous polymeric materials of the present invention comprise polyisobutylene, polybutenes, butyl rubber, or combinations thereof. In another embodiment, elastomers comprise copolymers of ethylene and other monomers such as ethylene-propylene copolymer, referred to as EPM, ethylene-octene copolymer, and ethylene-hexene copolymer. In another embodiment, elastomers comprise copolymers of propylene and other monomers such as ethylene-propylene copolymer, referred to as EPM, ethylene-octene copolymer, and polyethylene-hexene copolymer. In a further embodiment, elastomers comprise chlorinated polyethylene or chloro-sulfonated polyethylene. In a further embodiment, elastomers comprise ethylene vinyl acetate (EVA).

In some embodiments, elastomers suitable for use in sintered polymeric materials of the present invention comprise 1,3-dienes and derivatives thereof 1,3-dienes include styrene-1,3-butadiene (SBR), styrene-1,3-butadiene terpolymer with an unsaturated carboxylic acid (carboxylated SBR), acrylonitrile-1,3-butadiene (NBR or nitrile rubber), isobutylene-isoprene, cis-1,4-polyisoprene, 1,4-poly(1,3-butadiene), polychloroprene, and block copolymers of isoprene or 1,3-butadiene with styrene such as styrene-ethylene-butadiene-styrene (SEBS). In other embodiments, elastomers comprise polyalkene oxide polymers, acrylics, or polysiloxanes (silicones) or combinations thereof.

In a further embodiment, elastomers suitable for use in sintered polymeric materials of the present invention, in some embodiments, comprise FORPRENE®, LAPRENE®, SKYPEL®, SKYTHANE®, SYNPRENE®, RIMFLEX®, ELEXAR®, FLEXALLOY®, TEKRON®, DEXFLEX®, TYPLAX®, UCEFLEX®, DEXFLEX®, ENGAGE®, HERCUPRENE®, HI-FAX®, INNOPOL®, NOVALENE®, KRATON®, MUTT-FLEX®, EVOPRENE®, HYTREL®, NORDEL®, VERSIFY®, VISTAMAXX®, VITON®, VECTOR®, SILASTIC®, SANTOPRENE®, ELASMAX®, AFFINITY®, ATTANE®, and SARLINK®.

Sintered Porous Polymeric Media Comprising Both Plastic Particles and Elastomeric Particles A sintered polymeric material, according to some embodiments of the present invention, comprises at least one elastomer in an amount ranging from about 10 weight percent to about 90 weight percent. In other embodiments, a sintered polymeric material comprises at least one elastomer in an amount ranging from about 20 weight percent to about 80 weight percent. In another embodiment, a sintered polymeric material comprises at least one elastomer in an amount ranging from about 30 weight percent to about 70 weight percent. In a further embodiment, a sintered polymeric material comprises at least one elastomer in an amount ranging from about 40 weight percent to about 60 weight percent. In these embodiments, plastic constitutes the remainder or the majority of the remainder of the sintered polymeric material.

Sintered polymeric materials comprising at least one plastic and at least one elastomer, according to some embodiments of the present invention, are porous. In one embodiment, for example, a sintered polymeric material has a porosity ranging from about 10% to about 90%. In another embodiment, a sintered polymeric material comprising at least one plastic and at least one elastomer has a porosity ranging from about 20% to about 80% or from about 30% to about 70%. In a further embodiment, a sintered polymeric material comprising at least one plastic and at least one elastomer has a porosity ranging from about 40% to about 60%.

Porous sintered polymeric materials comprising at least one plastic and at least one elastomer, according to some embodiments of the present invention, have an average pore size ranging from about from about 1 µm to about 200 µm. In other embodiments, porous sintered polymeric materials comprising at least one plastic and at least one elastomer have an average pore size ranging from about 2 µm to about 150 µm, from about 5 µm to about 100 µm, or from about 10 µm to about 50 µm. Sintered polymeric materials comprising at least one plastic and at least one elastomer, according to some embodiments, have a density ranging from about 0.1 g/cm$^3$ to about 1 g/cm$^3$. In other embodiments, a sintered polymeric material of the present invention comprising at least one plastic and at least one elastomer has a density ranging from about 0.2 g/cm$^3$ to about 0.8 g/cm$^3$ or from about 0.4 g/cm$^3$ to about 0.6 g/cm$^3$. In a further embodiment, a sintered polymeric material comprising at least one plastic and at least one elastomer has a density greater than about 1 g/cm$^3$.

EMBODIMENTS OF THE PRESENT INVENTION

One embodiment of the present invention provides a membrane-coated porous media with a three dimensional profile, such as nib, hollowed nib, sphere, tube, rod or a complicated shape as a filter medium which may be coupled with a housing, such as a pipette tip. The membrane-coated porous media can be used to block or capture certain targets by size, such as bacteria or viruses.

In another embodiment, the present invention provides a membrane-coated porous media with a three-dimensional profile, such as a nib, hollowed nib, sphere, tube, rod or complicated shape as a capture media which may be coupled with a housing, such as a pipette tip. The membrane-coated three-dimensional media can be used to increase surface area for binding or capturing certain target molecules by affinity, such as proteins, antibodies, DNA or RNA fragments.

In yet another embodiment, the present invention provides a device comprising a membrane-coated porous media with a three-dimensional profile, such as a nib, hollowed nib, sphere, tube, rod or complicated shape as a capture media. The device can comprise another porous media as a reservoir, or a storage media for chemicals and liquids, or a blocking media to prevent over drawing of liquid into the pipetting device.

In one embodiment, the device can be a pipetting device or any device that can apply a vacuum on one end of a pipette tip and has a membrane-coated porous media with a three-dimensional profile at the other end of the pipette tip.

The membrane-coated sintered porous medium can be inserted into the pipette tip to achieve a frictional fit or a mechanical coupling.

In another embodiment the sintered porous media can be inserted into the narrow end of a pipette tip until it extends to the opening of the narrow end of the pipette tip. This sintered porous media and the outer wall of the pipette tip adjacent to the porous media are then coated with the membrane.

In another embodiment the sintered porous media can be inserted into the wide end of a pipette tip until it extends to the opening of the narrow end of the pipette tip. This sintered porous media and the outer wall of the pipette tip adjacent to the porous media are then coated with the membrane.

In one embodiment, the present invention provides a membrane-coated, sintered porous plastic as a sample collection medium.

In another embodiment the present invention provides a membrane-coated, sintered porous plastic medium containing elastomeric material as a sample collection medium.

In still another embodiment the present invention provides a membrane-coated, sintered porous fiber material.

In yet another embodiment, the present invention provides that the porous media is coated with the membrane in specific regions such as at an end of the sintered porous media.

In another embodiment the present invention provides a membrane coated on partial regions of an external surface of sintered porous plastic media, or an external surface of a thermally bonded fiber part.

In another embodiment the present invention provides a membrane coated on an external surface of a sintered porous polymeric media or a sintered porous fiber media, and a membrane partially coating a surface of the housing adjacent to the external surface of a sintered porous polymeric media or a sintered porous fiber media.

Method of Making the Membrane and Attaching it to the Sintered Porous Polymeric Material for Use in the Device Methods of making membranes are known to one of ordinary skill in the art. Example 1 of U.S. Pat. No. 7,674,517 discloses a representative method.

The sintered porous parts or devices shown in FIGS. 1 through 5 were dipped into a solution for 1 minute, removed from the solution, and rotated to form a uniform coating. The parts and devices were then immersed into a room temperature water bath for 4 hours. Next, the parts and devices were dried at ambient temperature.

Figure 2:
FIG. 2. Schematic representations of pipette tips with sintered porous polyethylene media inserted into the barrel of each pipette tip. The left image shows un-coated media in the pipette tip and the right image shows a PVDF membrane-coated filter pipette tip. The membrane is in dark color.

One method of making a device comprising a membrane-coated sintered porous polymeric media or a membrane-coated porous fiber media is presented in this paragraph. First a sintered porous media or fiber media is inserted into a housing, for example a pipette tip, a tube or a pen. Next a portion of the sintered porous media or porous fiber media is exposed outside of the housing. The sintered porous media or porous fiber media is then dipped into a membrane coating solution which uniformly coats an external surface of the sintered porous media or porous fiber media and part of the housing adjacent to the sintered porous media or porous fiber media. Then a vacuum is optionally applied to control the penetration of membrane solution into the sintered porous media or porous fiber media. The coated part is then dipped into a non-solvent solution, such as water, to form the phase inversion membrane on the sintered porous media or porous fiber media. The membrane may also form the seal between a gap which may exist between the sintered porous media or porous fiber and the adjacent housing. Next the devices are dried. (FIG. 2).

In another method of making the device, the porous medium is coated with the precipitated membrane and then inserted into the device.

Figure 3:
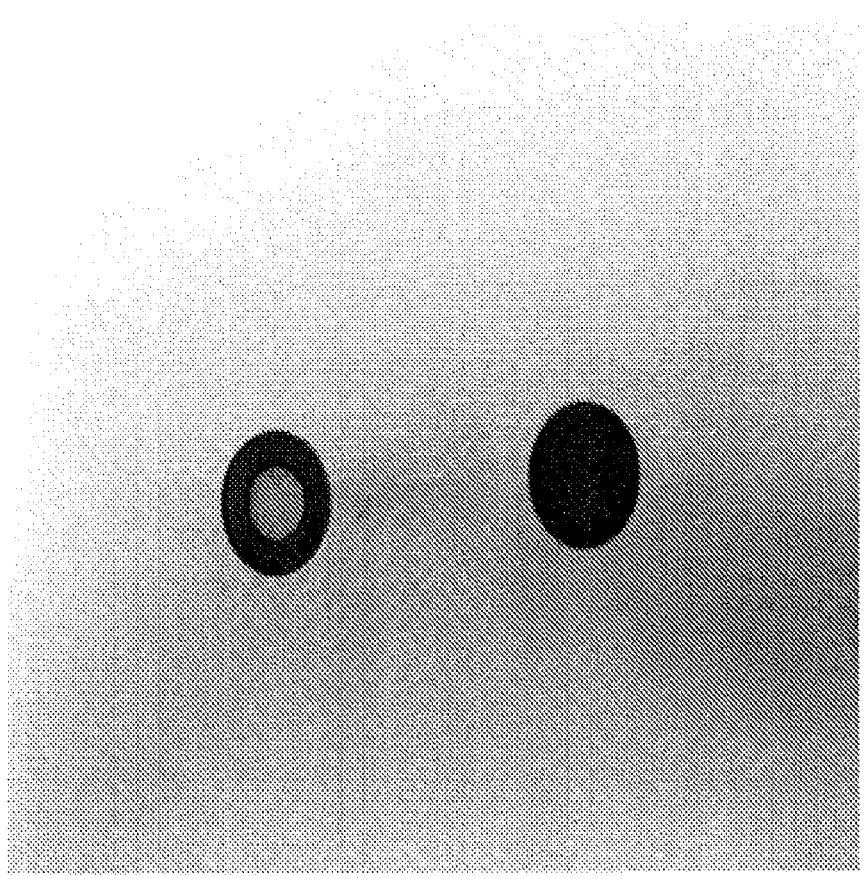
FIG. 3. Schematic representations of membrane-coated Porex serum filter (Porex Corporation, Fairburn, Ga.). The left image shows an un-coated Porex polyethylene serum filter, and the right image shows a PVDF membrane-coated Porex serum filter. Note the PVDF membrane covers the center of the serum filter.
Figure 4:
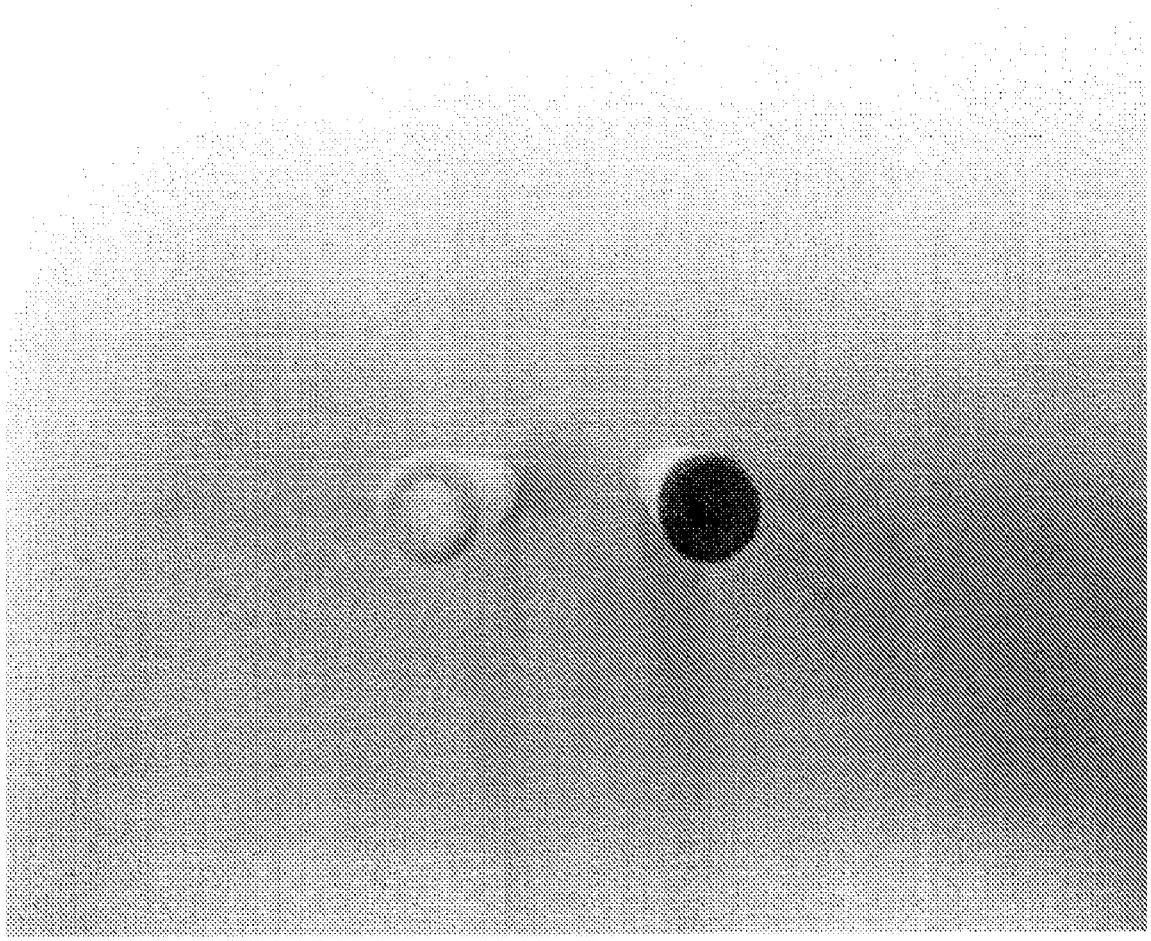
FIG. 4. Schematic representation of PVDF membrane-coated sintered porous polyethylene tube. The left image shows a tube before coating, and the right image shows a membrane-coated sintered porous plastic tube. The membrane seals the opening of the sintered porous plastic tube and is anchored into the sintered porous plastic media.

In another embodiment, the method of forming a porous submicron filtration device comprises: dipping the filter-end of a serum filter into a membrane coating solution and uniformly coating the membrane solution on the filter and seal; removing the serum filter from the membrane coating solution and dipping the serum filter into a non solvent solution (such as water) to form a phase-participating membrane onto the sintered porous plastic filter; removing the serum filter from the non solvent solution: and, drying. The membrane-coated serum filter can filter out paticles less than 1 micron (FIG. 3).

Figure 5:
FIG. 5. Schematic representation of PVDF membrane-coated porous fiber tube. The porous fiber tube was made by sintering polyethylene/polyethylene terephthalate (PE/PET) bicomponent fibers. The left image shows a tube before coating, and the right image shows a membrane-coated porous fiber tube. The membrane seals the opening of porous fiber tube and is anchored into the porous fiber media.
Figure 6:
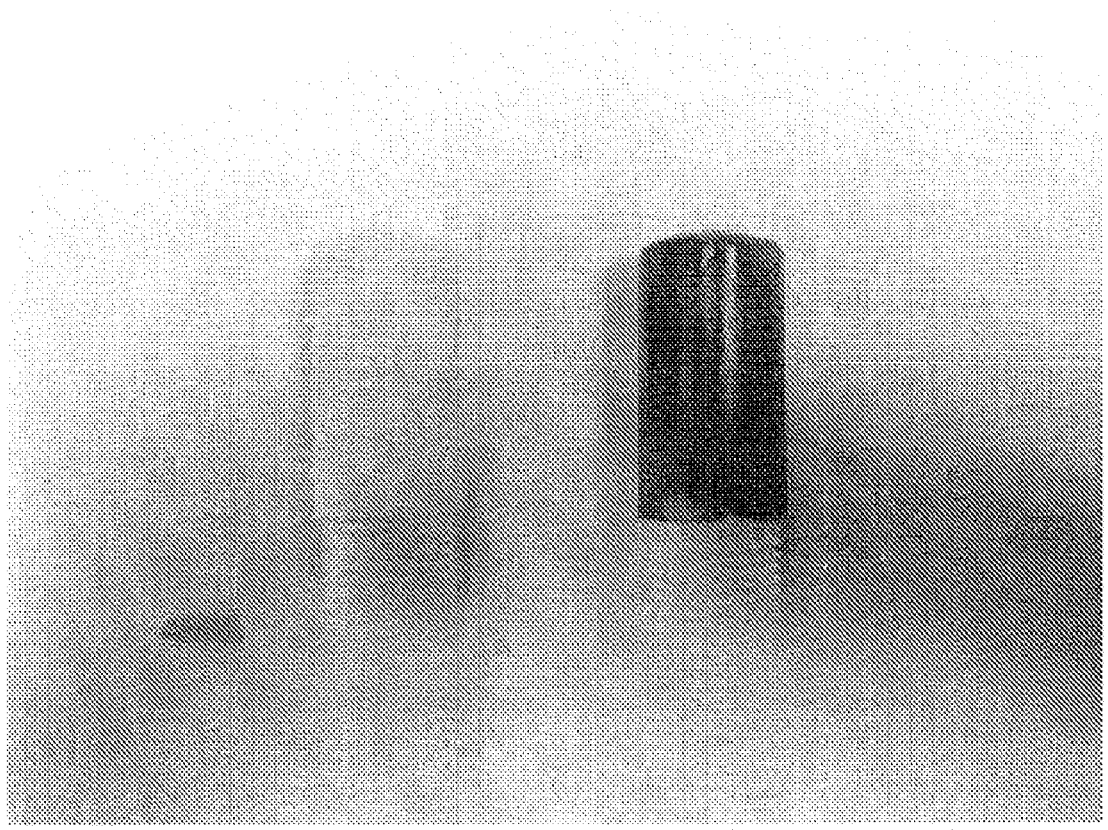
FIG. 6. Schematic representation of membrane-coated Porex sintered porous filter (Porex, Fairburn, Ga.). The left image shows a current Porex sintered porous filter before coating, and the right image shows a PVDF membrane-coated Porex sintered filter. The membrane is dark.

In another embodiment, the method of forming a porous membrane on a sealed porous hollow structure comprises: dipping a sintered porous plastic tube or porous fiber tube into a membrane coating solution and uniformly coating the membrane solution on one end of a sintered porous plastic tube or porous fiber tube; removing the sintered porous plastic tube or porous fiber tube from the membrane coating solution and dipping the coated sintered porous plastic tube or coated fiber tube into a non solvent solution (such as water) to form a phase-participating membrane on the sintered porous plastic tube or fiber tube; removing the tubes from non solvent solution; and, drying. The membrane seals one end of the tube and anchors into the sintered porous plastic tube wall (FIG. 4) or fiber tube wall (FIG. 5).

The device may be filled with medium such as fluid from a reservoir attached to a pipette device. The membrane-coated porous medium may be used as a filtration medium, a sample collection medium or a sample application medium. In various embodiments, the devices and porous components in WO2012/145390 and WO2012/145379 may be coated with the membranes described in the present invention.

The porous materials used in commercial writing instrument nibs can be used as rigid porous media for membrane coating in the present invention. The writing instruments include permanent markers, dry erase and highlighter. Non-limiting examples of such writing instruments include, SHARPIE®, EXPO®, HI-LITER®, CRAYOLA® and BIC®. For example, pen nibs and cosmetic nibs made by Teibow Co., Ltd. (Japan) can be used as a porous media for membrane coating.

Polymeric particles in this invention include plastic particles, optionally in combination with elastomeric particles.

Polymeric particles, in some embodiments, have average sizes ranging from about 1 µm to about 1 mm. In another embodiment, polymeric particles have average sizes ranging from about 10 µm to about 900 µm, from about 50 µm to about 500 µm, or from about 100 µm to about 400 µm. In a further embodiment, polymeric particles have average sizes ranging from about 200 µm to about 300 µm.

Polymeric particles, in some embodiments, are sintered at a temperature ranging from about 200° F. to about 700° F. In some embodiments, polymeric particles are sintered at a temperature ranging from about 300° F. to about 500° F. The sintering temperature, according to embodiments of the present invention, is dependent upon and selected according to the identity of the polymeric particles.

Polymeric particles, in some embodiments, are sintered for a time period ranging from about 30 seconds to about 30 minutes. In other embodiments, polymeric particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of polymeric particles is administered under ambient pressure (1 atm). In other embodiments sintering of polymeric particles is administered under pressures greater than ambient pressure.

The present invention provides methods for producing a porous polymeric material for a device or component thereof comprising sintered thermoplastic materials. In one embodiment, providing a sintered porous thermoplastic component comprises providing a particles of a plurality of thermoplastic particles and sintering the thermoplastic particles. Thermoplastic particles, in some embodiments, have average sizes ranging from about 1 µm to about 1 mm. In another embodiment, thermoplastic particles have average sizes ranging from about 10 µm to about 900 µm, from about 50 µm to about 500 µm, or from about 100 µm to about 400 µm. In a further embodiment, thermoplastic particles have average sizes ranging from about 200 µm to about 300 µm. In some embodiments, thermoplastic particles have average sizes less than about 1 µm or greater than about 1 mm.

Thermoplastic particles, in some embodiments, are sintered at a temperature ranging from about 200° F. to about 700° F. In some embodiments, thermoplastic particles are sintered at a temperature ranging from about 300° F. to about 500° F. The sintering temperature, according to embodiments of the present invention, is dependent upon and selected according to the identity of the thermoplastic particles.

Thermoplastic particles, in some embodiments, are sintered for a time period ranging from about 30 seconds to about 30 minutes. In other embodiments, thermoplastic particles are sintered for a time period ranging from about 1 minute to about 15 minutes or from about 5 minutes to about 10 minutes. In some embodiments, the sintering process comprises heating, soaking, and/or cooking cycles. Moreover, in some embodiments, sintering of thermoplastic particles is administered under ambient pressure (1 atm). In other embodiments sintering of thermoplastic particles is administered under pressures greater than ambient pressure.

The following examples will serve to further illustrate the present invention without, at the same time, however, constituting any limitation thereof. On the contrary, it is to be clearly understood that resort may be had to various embodiments, modifications and equivalents thereof which, after reading the description herein, may suggest themselves to those skilled in the art without departing from the spirit of the invention.

Example 1

Solution for Polyvinylidene Fluoride (PVDF) Membrane

To a 1 liter HDPE bottle, 65 g PVDF (KYNAR® 2800 from Arkema, Inc.), 420 g of DMAc (Sigma Aldrich, St. Louis, Mo.), and 15 g of LiCl (Sigma, Aldrich, St. Louis, Mo.) were added together. The bottle was placed on a rolling mill at about 30 rpm overnight. The solution was examined for color (slight yellowish) and was free of gel lumps. For visualization purposes, a small amount of dye may be added for coloring to see the membrane.

Example 2

Solution for Cellulose Acetate (CA) Membrane

To a 1 liter HDPE bottle, 65 g cellulose acetate (Sigma, Aldrich, St. Louis, Mo.), 520 g of DMAc (Sigma, Aldrich, St. Louis, Mo.), 15 g of LiCl (Sigma, Aldrich, St. Louis, Mo.) and 5 g deionized water were added together. The bottle was placed on a rolling mill at about 30 rpm overnight. The solution was examined for color (white to slight yellowish) and was free of gel lumps.

Example 3

Solution for Nylon 6 Membrane

To a 1 liter HDPE bottle, 100 g nylon 6 (Sigma Aldrich, St. Louis, Mo.), 600 ml Formic acid (Sigma Aldrich, St. Louis, Mo.), and 100 ml methanol were added together. The bottle was placed on a rolling mill at about 30 rpm overnight. The solution was examined for color (yellowish) and was free of gel lumps.

Example 4

Solution for Polyacrylonitrile (PAN) Membrane

To a 1 liter HDPE bottle, 65 g polyacrylonitrile (Good Fellow, Inc.), 650 g of DMAc (Sigma Aldrich, St. Louis, Mo.), 15 g of LiCl (Sigma Aldrich, St. Louis, Mo.) and 5 g deionized water were added together. The bottle was placed on a rolling mill at about 30 rpm overnight. The solution was examined for color (white to slight yellowish) and was free of gel lumps.

Example 5

Solution for Polyethersulfone (PES) Membrane

To a 1 liter HDPE bottle, 65 g polyethersulfone (VERADEL® 3000P, Solvay, Inc.), 420 g of DMAc (Sigma Aldrich, St. Louis, Mo.), 15 g of LiCl (Sigma Aldrich, St. Louis, Mo.) were added together. The bottle was placed on a rolling mill at about 30 rpm overnight. The solution was examined for color (white to slight yellowish) and was free of gel lumps.

Example 6

A Device with Pipette Tip, Sintered Porous Plastic Filter and PVDF Membrane Coating.

Figures 7A, 7B, 7C:
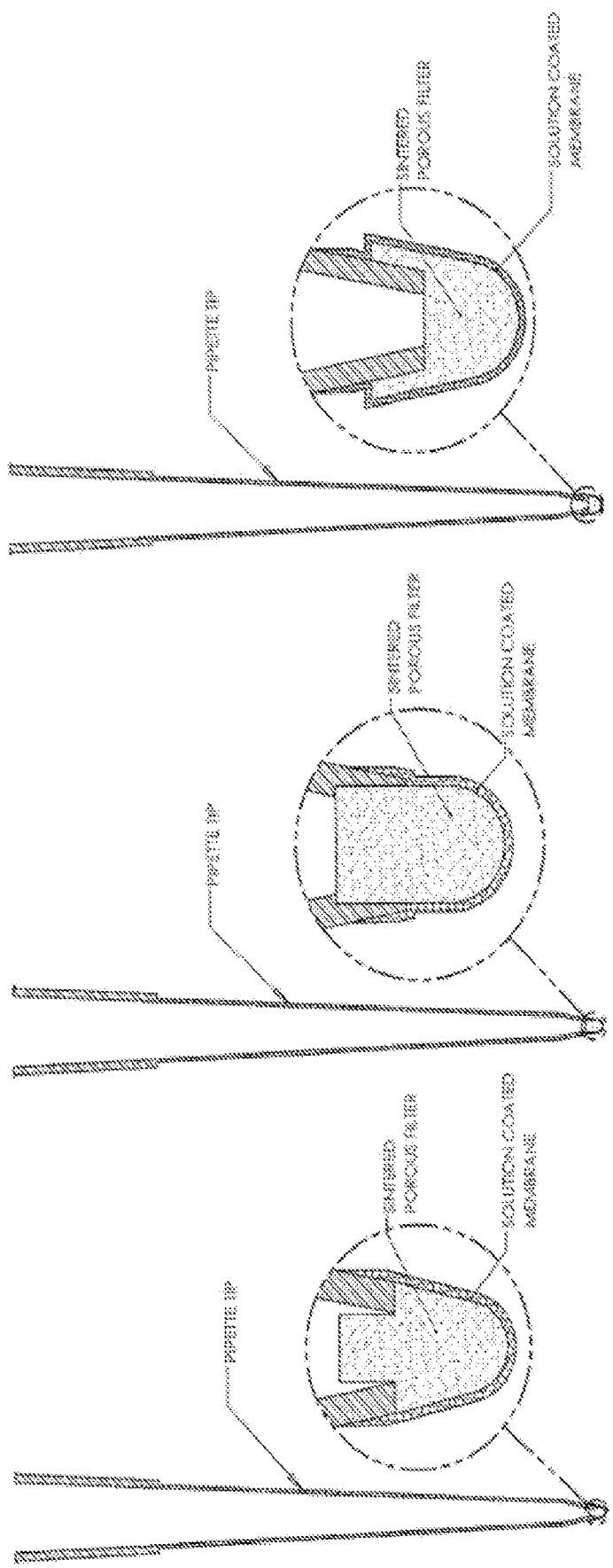
FIG. 7A shows a sintered porous filter at the narrow end of the pipette tip with part of the filter inside the lumen of the pipette tip.
FIG. 7B shows a sintered porous filter at the narrow end of the pipette tip with part of the filter inside the lumen of the pipette tip. The inner wall of the pipette tip is configured to receive the sintered porous filter.
FIG. 7C shows a sintered porous filter at the narrow end of the pipette tip with part of the filter outside the lumen of the pipette tip and contacting the outer walls of the pipette tip.
Figure 8:
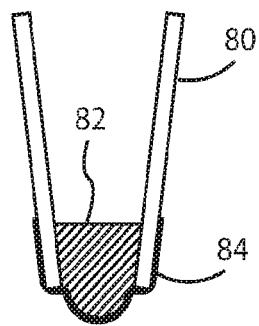
FIG. 8 is a schematic representation of a device comprising a housing 80, a sintered porous filter 82 and a membrane 84 formed from a solution which coats part of the outer surface of the sintered porous filter and the adjacent outer surface of the housing thereby forming a seal. In this case, the sintered porous filter in introduced into the wider opening of the housing and inserted into the narrow opening of the housing so that it partially protrudes from the narrow opening of the housing.
Figure 9:
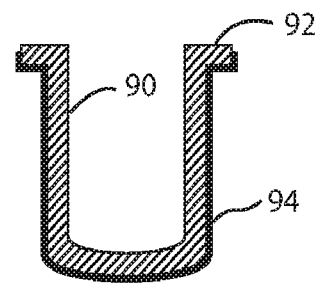
FIG. 9 is a schematic representation of a device comprising a sintered porous component 90, open on one end and closed on the other end, with an annular flange 92 surrounding the open end and a membrane 94 formed from a solution which coats the outer surface of the sintered porous component. The sintered porous component is assembled into a vacuum housing for in line filtration.
Figure 10:
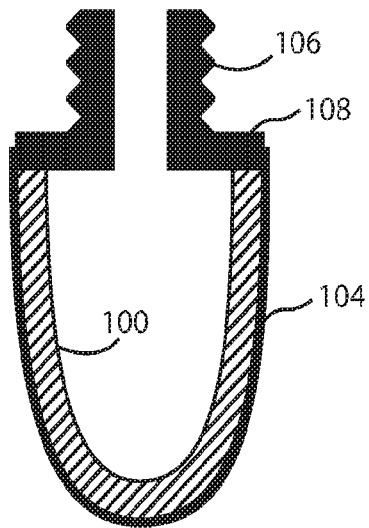
FIG. 10 is a schematic representation of a device comprising a sintered porous component 100 open on one end and closed on the other end and a membrane 104 formed from a solution coating the sintered porous component 100. The open end of the sintered porous component is in contact with a hollow injection molded component 106 with an annular flange 108 which contacts the walls of the open end of the sintered porous component. The membrane 104 is formed by dip coating the device. The membrane 104 covers the external surface of the sintered porous component 100 and extends over part of the flange 108 of the molded component thereby forming a seal. The device can be used as a muffler or a liquid or gas filter.
Figure 11:
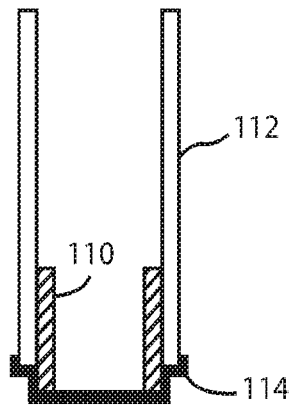
FIG. 11 is a schematic representation of a device comprising a sintered porous tubular component 110 open at both ends and inserted into a hollow housing 112 so that the sintered porous tubular component is located near an open end of the housing and may slightly protrude from that open end. The hollow housing and adjacent end of the sintered porous tubular component are dipped into a membrane solution which forms a membrane 114 over the open end of the sintered porous tubular component 110, the exposed walls of the sintered porous component and the adjacent walls of the housing, thereby forming a seal.
Figure 12:
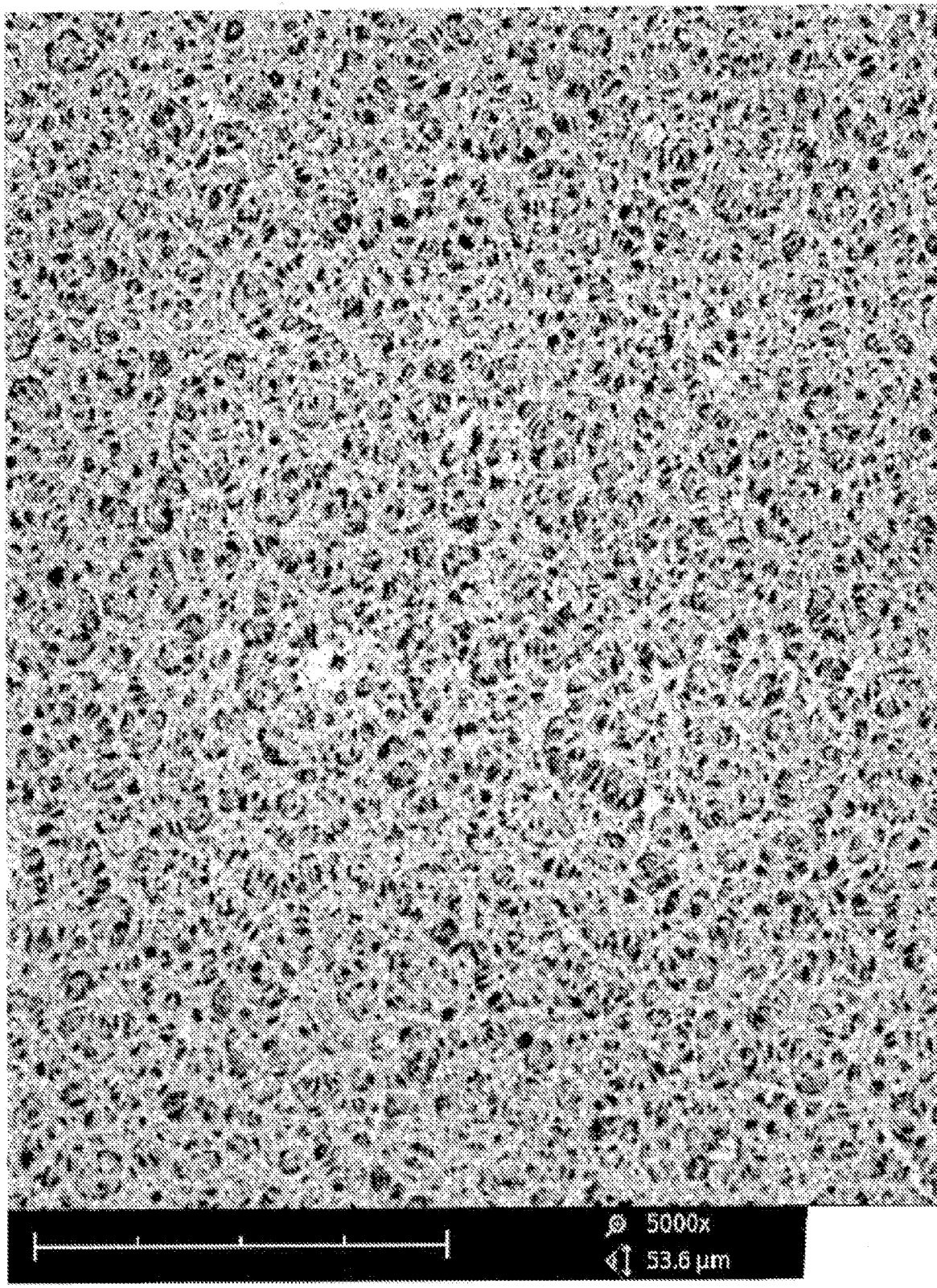
FIG. 12 is a scanning electron micrograph of a porous PVDF membrane covering a sintered porous polyethylene filter. The micrograph demonstrates the uniformity of the porous PVDF membrane. Magnification 5000×.

A 1 ml pipette tip (MAXYMUM RECOVERY™ brand, Axygen Scientific Inc., Union City, Calif.) was cut at the tip and a sintered porous polyethylene filter with an average pore size of 25 microns was inserted into the pipette tip to form a device as shown in FIG. 7A. The device was dipped into a PVDF solution for about 5 seconds at a level of about 2 mm above the insertion line, removed from the solution and then dipped into a deionized water bath for about 1 hour. The device was then dried at room temperature for over 24 hours. A PVDF membrane was formed on the outer walls of the pipette tip and also covered the cut end of the pipette tip.

Example 7

A Device with Pipette Tip, Sintered Porous Plastic Filter and PVDF Membrane Coating.

A sintered porous polyethylene filter with an average pore size of 25 microns was inserted into a special designed pipette tip housing (FIG. 7B). One end of the housing was designed to accommodate the sintered porous plastic filter. The filter outer diameter was matched with the inner diameter of one end of the housing. The flange in the housing limited the insertion depth of the sintered porous filter. The device was dipped into a PVDF solution for about 5 seconds at a level of about 3 mm above the sintered porous plug, removed from the membrane solution and then dipped into a deionized water bath for about 1 hour. The device was then dried at room temperature for over 24 hours. A PVDF membrane was formed on the outer walls of the porous filter and the housing.

Example 8

A Device with Pipette Tip, Sintered Porous Plastic Filter and PVDF Membrane Coating.

A sintered porous polyethylene filter with an average pore size of 25 microns and a recessed part in the sintered porous medium for filling into a pipette tip is shown in FIG. 7C. A sintered porous filter was inserted into the recess of a 1 ml pipette tip (Maxymum Recovery brand, Axygen Scientific Inc., Union City, Calif.) to form a device as shown in FIG. 7C. The device was dipped into a PVDF solution for about 5 seconds at a level of about 3 mm above the sintered porous filter, removed from the PVDF solution and then dipped into a deionized water bath for about 1 hour. The device was then dried at room temperature for over 24 hours. A PVDF membrane was formed on the outer walls of the porous filter and the pipette tip.

Example 9

A Device with Pipette Tip, Sintered Porous Plastic Filter and PES Membrane Coating.

A 1 ml pipette tip (Maxymum Recovery brand, Axygen Scientific Inc., Union City, Calif.) was cut at the tip and a sintered porous polyethylene filter with an average pore size of 25 microns was inserted into the pipette tip to form a device as shown in FIG. 7A. The device was dipped into a PES solution of example 5 for about 5 seconds at a level of about 2 mm above the insertion line, removed from the solution and then dipped into a deionized water bath for about 1 hour. The device was then dried at room temperature for over 24 hours. A PES membrane was formed on the outer walls of the pipette tip and also covered the cut end of the pipette tip.

Example 10

Separation of Whole Blood.
The membrane-coated tip made in example 9 was pre-treated with a 1% TWEEN® 20 solution. About 200 µl of whole bovine blood (Lampire Biological Laboratories, Pipersville, Pa.) was pipetted into the pipette tip through the open end. A 1 ml VWR brand pipettor was used to push the whole blood from the open end through the sintered polymeric medium with attached porous membrane by applying air pressure through the pipettor. A small amount of yellow liquid appeared on the membrane covering the external surface of the pipette filter tip.

Example 11

Separation of Blue Dextran.
A blue dextran solution was made by dissolving 1 g of blue dextran (2,000,000 MW, Sigma, St. Louis, Mo.) into 100 ml of deionized water. 200 µl of the dark blue dextran solution was pipetted into the open end of the pipette tip device of Example 9 with a PES membrane. A 1 ml VWR brand pipettor was used to push the blue dextran solution from the open end through the sintered plastic polymeric medium with attached porous membrane by applying air pressure through the pipettor. A small amount of light blue liquid appeared on the membrane covering the external surface of the pipette filter tip.

Example 12

Binding of Blue Dextran.
Dye molecules were used to test the binding capabilities of different membrane. A 0.1% blue dextran (Sigma, St. Louis, Mo.) aqueous solution was used to test membrane binding capability. Different filters with a PVDF membrane, PES membrane, or cellulose acetate (CA) membrane were dipped into the 0.1% blue dextran solution for about 1 minute and then rinsed with tap water for about 5 seconds. The colors of the filters were recorded. PES and CA showed higher blue dextran binding capability than the PVDF membrane.

Example 13

Binding of Basic Red Dye
Basic red 29 water solution (0.1%, Sigma, St. Louis, Mo.) was used to test the capabilities of different membrane filters to bind binding positively charged dye molecules. Different filters with a PVDF membrane, PES membrane, CA membrane, nylon 6 membrane or a polyacrylonitrile (PAN) membrane were dipped into 0.1% basic red 29 solution for 1 minute and then rinsed with tap water for 5 seconds. The colors of the filters were recorded. The red color on the filter from strong to weak occurred in the following sequence, Nylon, CA, PES, PAN and PVDF.

Example 14

Binding of Streptavidin-HRP Molecules.
A device with a PVDF membrane coating a sintered porous filter as described in Example 6, was tested for protein binding. A solution of 0.1 mg/ml Streptavidin-horseradish peroxidase (HRP) (Sigma Aldrich, St. Louis, Mo.) in phosphate buffered saline (PBS 0.01 M phosphate buffered saline with 0.15 M NaCl, pH 7.2) was used to test streptavidin binding capability of the membrane. The filter tip was dipped into 0.1 mg/ml Streptavidin-HRP PBS buffer solution for 10 seconds and then rinsed in PBS buffer for 30 seconds with gentle shaking. The filter was dipped into 3,3',5,5'-tetramethylbenzidine (TMB) membrane peroxidase substrate solution, (Sigma Aldrich, St. Louis, Mo.). The color of the filter was observed for 3 minutes. The filter changed from white to purple.

Example 15

Binding of Biotin and Streptavidin-HRP Molecules.

A device with a PVDF membrane-coated filter (Example 6) was tested for biotin binding. A filter was dipped into 1 mg/ml biotin (Sigma, St. Louis, Mo.) PBS solution for 10 seconds and then rinsed in a PBS buffer for 30 seconds. A new PVDF membrane filter and a biotin coated PVDF membrane filter were dipped into 2 mg/ml BSA PBS solution for 10 seconds and then rinsed in PBS buffer for 30 seconds. The PVDF membrane filter without biotin coating was used as a control. Both filters were dipped into 0.1 mg/ml Streptavidin-HRP PBS buffer solution (PBS is 0.01 M phosphate buffered saline with 0.15 M NaCl, pH 7.2) for 10 seconds and then rinsed in PBS buffer for 30 seconds with slow movement. The filters were dipped into 3,3',5,5'-Tetramethylbenzidine (TMB) membrane peroxidase substrate solution (Sigma Aldrich, St. Louis, Mo.). The color of the filter was observed for 3 minutes. The filter with the biotin coating changed from white to purple while the filter without the biotin coating was white. The results indicate that the membrane-coated filter of the device of the present invention can be used for selectively binding biomolecules and as an ELISA substrate.

All patents, publications and abstracts cited above are incorporated herein by reference in their entirety. It should be understood that the foregoing and the figures relate only to preferred embodiments of the present invention and that numerous modifications or alterations may be made therein without departing from the spirit and the scope of the present invention as defined in the following claims.

The invention claimed is:

1. A device comprising:
a sintered porous polymeric medium;
a solution-coated phase inversion porous membrane;
a housing with a single lumen defined by an inner wall and an outer wall, an open first end and an open second distal end;
wherein the sintered porous polymeric medium is located at the open second distal end of the single lumen of the housing and the solution-coated phase inversion porous membrane at least partially covers the sintered porous polymeric medium and a portion of the adjacent outer wall of the housing, forming a seal over the open second distal end.

2. The device of claim 1, wherein the sintered porous polymeric medium comprises fiber materials, plastic particles, or plastic particles optionally in combination with elastomeric particles.

3. The device of claim 2, wherein the plastic particles comprise a polyolefin.

4. The device of claim 3, wherein the polyolefin is polyethylene.

5. The device of claim 4, wherein the polyethylene is ultrahigh molecular weight polyethylene or high density polyethylene.

6. The device of claim 1, wherein the sintered porous polymeric medium is a nib, a hollowed nib, a tube, a sphere, a rod, a cylinder or has a shape to fit into a pipette tip.

7. The device of claim 1, wherein the housing is a pipette tip.

8. The device of claim 1, wherein the porous membrane is a polyvinylidene fluoride (PVDF), a nylon, a polysulfone, a polyethersulfone (PES), a polyacrylonitrile, a cellulose acetate or a nitrocellulose membrane.

9. A method of making the device of claim 1, comprising:
sintering a polymeric material to form a sintered porous polymeric medium;
partially inserting the sintered porous polymeric medium into a housing with a lumen, a first open end and a second open distal end, so that a portion of the sintered porous polymeric medium is located at one of the open ends of the housing or extends beyond one of the open ends of the housing;
applying a membrane solution to the sintered porous polymeric medium located at one of the open ends of the housing or extending beyond one of the open ends of the housing and to an adjacent outer wall of the housing in order to form a solution-coated phase inversion membrane; and, permitting the membrane solution to dry.

10. The method of claim 9, wherein the sintered porous polymeric medium comprises fiber materials, plastic particles, or plastic particles optionally in combination with elastomeric particles.

11. The method of claim 9, wherein the solution-coated phase inversion membrane is a polyvinylidene fluoride (PVDF), a Nylon, a Polysulfone, a polyethersulfone (PES), a polyacrylonitrile, a cellulose acetate or a nitrocellulose membrane.

12. The method of claim 10, wherein the plastic particles comprise polyolefin, polyethylene, ultrahigh molecular weight polyethylene, or high density polyethylene.

13. A method of filtering a fluid comprising:
providing the device of claim 1;
contacting the fluid to the solution-coated phase inversion porous membrane or to the sintered porous polymeric medium;
applying a partial vacuum to the solution-coated phase inversion porous membrane and the sintered porous polymeric medium thereby pulling fluid through the solution-coated phase inversion porous membrane and the sintered porous polymeric medium; and, collecting the filtered fluid.

14. A method of filtering a fluid comprising:
providing the device of claim 1;
delivering the fluid into the device through the first open end of the device and;
applying a pressure to the solution-coated phase inversion porous membrane and sintered porous polymeric medium through the first open end of the device and thereby pushing fluid through the solution-coated phase inversion porous membrane and the sintered porous polymeric medium; and, collecting the filtered fluid.

15. A method of capturing an analyte from a fluid comprising:
providing the device of claim 1;
contacting the fluid containing the analyte with the solution-coated phase inversion porous membrane;
applying a partial vacuum to the solution-coated phase inversion porous membrane and the sintered porous polymeric medium thereby pulling the fluid through the solution-coated phase inversion porous membrane and into the sintered porous polymeric medium; and, binding the analyte to the porous membrane.

16. The method of claim 15, further comprising releasing the analyte from the porous membrane onto a desired surface or into a solution.

17. The device of claim 1, wherein the sintered porous polymeric medium has an average pore size above about 5 microns and wherein the porous membrane has an average pore size less than about one micron.

* * * * *